Aug. 7, 1962
K. D. ELWICK
3,048,409
MATERIAL UNLOADING APPARATUS
Filed Jan. 31, 1961
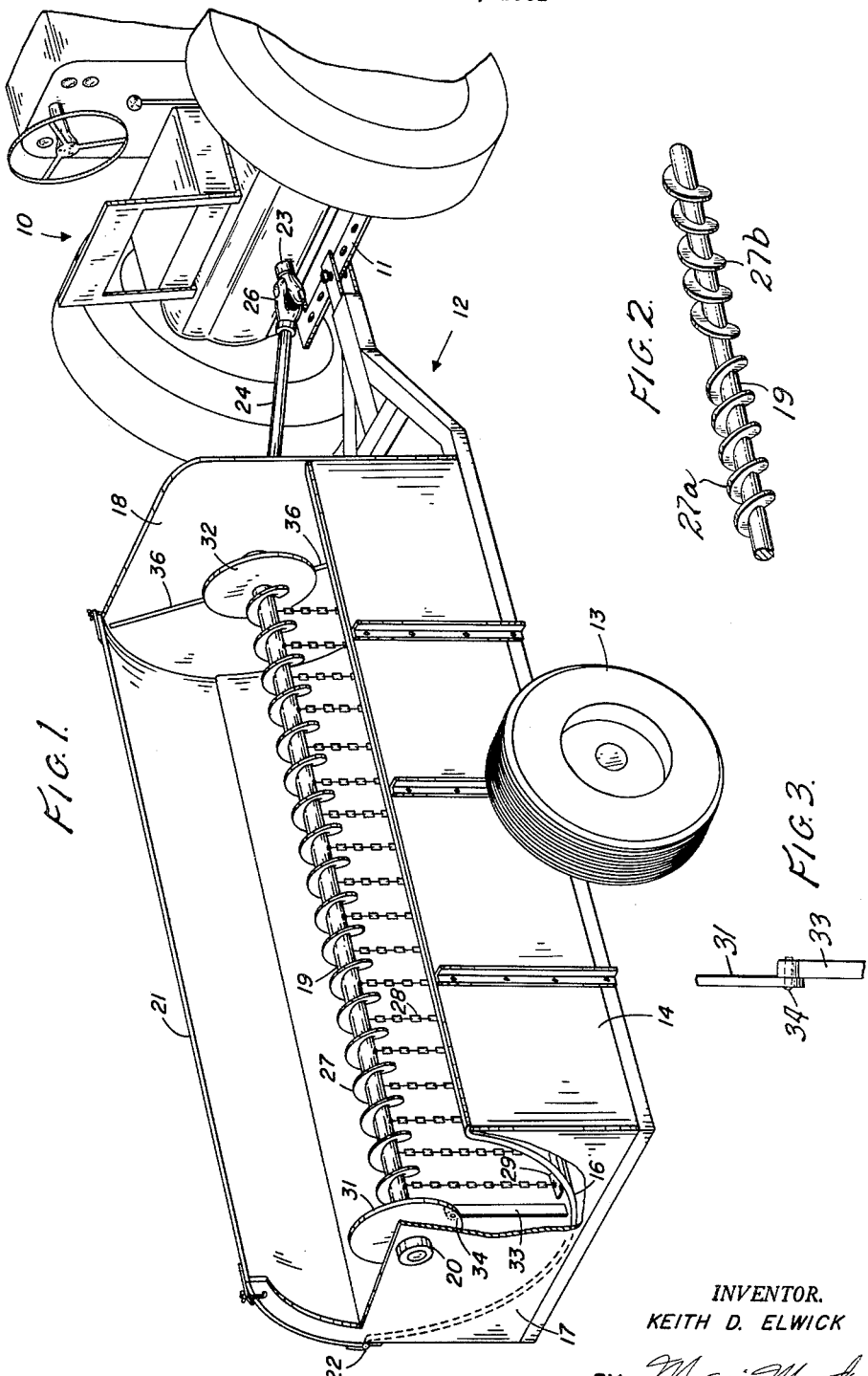
INVENTOR.
KEITH D. ELWICK
BY *Marion Moody*
ATTORNEY

United States Patent Office 3,048,409
Patented Aug. 7, 1962

3,048,409
MATERIAL UNLOADING APPARATUS
Keith D. Elwick, Vinton, Iowa, assignor to Hawk Bilt Mfg. Corp., Vinton, Iowa, a corporation of Iowa
Filed Jan. 31, 1961, Ser. No. 86,086
13 Claims. (Cl. 275—3)

The invention relates in general to apparatus for unloading and spreading material, and specifically to an improvement of my invention shown and described in Patent Number 2,886,332, dated May 12, 1959, entitled, "Flail-Type Material Unloader."

My issued Patent 2,886,332 shows a manure spreader having a receiving container which rotatably supports a shaft driven from the power takeoff of a towing tractor. Extensible flails are attached to the shaft and initially are wound around the shaft, and as the shaft rotates the manure or other litter is pulverized and flung from the container. As more and more of the load is removed, the extensible flails extend further from the shaft, due to centrifugal force, and complete the unloading.

When a device in accordance with Patent 2,886,332, or the present disclosure, is first filled with material, the material is ordinarily piled over the rotatable shaft; and in such circumstances it is difficult to start the discharge of litter from the container by operation of the flails, especially if the material is very dense, agglomerated, or frozen.

In accordance with the present invention, the shaft is provided with rigid starter means which extends only a short distance radially from the shaft, and which preferably takes the form of a helical conveyor auger on the shaft. The starter means moves the material with respect to the shaft so as to loosen it and start cutting a trough in the litter around the shaft to permit free operation of the flails. Thus, the starter means is effective only during initial operation of the unit, and cooperates with the flails to produce a more rapid and positive action of the unloading mechanism.

The starter auger may be arranged to move material rearwardly or forwardly in the container, or both ways from a plane intermediate the ends of the shaft, and each end of the shaft is provided with a disc carrying a slinger or cleaning rod which takes the material originally at the ends of the container, or that material which is moved to the ends by the auger, and flings it from the container. Thus, the slinger rods also cooperate with the starting auger and the flails in the unloading of the container and the spreading of the material.

Where the material is very heavy, the first material is flung out by the slinger rods, and as the auger moves the litter toward an end of the container, the flails remote from that end are the first to be freed, and start unloading that end portion of the container. The auger gradually forms a longer and longer trough in the material around the shaft, and the flails working in the trough are effective to fling out the material.

While the apparatus is most commonly used as a spreader for litter, such as manure, for use as a fertilizer, it is also excellent for unloading and spreading any sort of coarse granular material, baled hay, agglomerated lime base materials, and others which are extremely difficult to break up, unload and spread. It can also handle liquids very effectively.

It is an object of the present invention, therefore, to provide an improvement in my material unloader shown in Patent 2,886,332, in that rigid starter means, preferably in the form of a helical conveyor auger, is attached to the driven shaft to aid in starting the unloading of the apparatus.

Another object is to provide discs at each end of the shaft to serve as buffer plates for the material being handled.

Another object is to provide such buffer plates with wiper blades that may be rigidly or pivotally attached thereto to facilitate cleaning and unloading the container.

Further objects and advantages will become apparent from the following description and claims when read in view of the drawing, in which:

FIG. 1 is a partially cut away perspective view of a preferred embodiment of the invention;

FIG. 2 is a fragmentary view on an enlarged scale of a modified unloading shaft and starter auger; and FIG. 3 is a fragmentary side elevational view of an end disc and pivoted slinger rod.

A tractor 10, partially shown, has a draw bar 11 to which is detachably connected the material handling vehicle 12 of this invention. The vehicle 12 may have two or more ground wheels 13 and has a body 14 which is formed with a semi-circular liner 16 that extends the length of the body and forms a bottom and side walls. End walls 17 and 18 support an unloading shaft 19 that is rotatably mounted in suitable bearings 20 on the axis of liner 16. The liner 16 and end walls 17 and 18 cooperate to form a container. An arcuate plate 21 is connected by hinges 22 to one side of the body 14 and may be selectively locked in the position shown in FIGURE 1, where it provides an extension of the liner 16, or may be swung back to facilitate loading the container.

The shaft 19 is connected to the power takeoff shaft 23 through a coupling shaft 24 and suitable universal joints 26 so that shaft 19 may be rotated when desired. Centrifugal unloading flails 28 are attached to shaft 19 and carry slings 29 at their outer ends to unload the body.

The structure as described up to this point is exactly in accordance with the disclosure of my Patent 2,886,332.

Rigid starter means, attached to shaft 19, in a preferred embodiment takes the form of a helical conveyor auger 27 which extends the length of the shaft. As seen in the drawing, auger 27 extends radially only a short distance from shaft 19, and thus is operative only during the first part of an unloading operation. The auger has a fin-like structure which provides, adjacent any flail member, a fin that is diagonal to a plane perpendicular to the axis of the shaft, so as to move material longitudinally of the shaft.

A first disc 31 is attached to shaft 19 adjacent end wall 17 and a second disc 32 is attached to shaft 19 adjacent end wall 18. As best seen in FIG. 3, a slinger member in the form of a rod 33 is pivotally attached to disc 31 by a suitable pin 34, so that it may move only parallel to wall 17 to aid material unloading. A pair of cleaning members in the form of rods 36 are rigidly attached to plate 32 so that they may move only parallel to the wall 18 and also aid in material unloading.

In operation, the flails 28 are wound about shaft 19 by driving shaft 19 slowly. Then body 14 is filled with manure or other litter to be handled. The arcuate plate 21 may be swung out to simplify loading, if desired, and may thereafter be locked in the position shown. When the material is to be unloaded and spread, the power take-off is engaged to drive shaft 19. Flails 28 and slings 29 start to fling material out of the body. The auger 27 makes it easier to start shaft 19 from rest, and also moves the material toward the end of the wagon.

The flails 28 unwind from shaft 19 due to centrifugal force as more and more material is unloaded, until they are fully extended so that slings 29 just clear cylindrical liner 16 when the body is empty.

Slinger rods 33 clean out the rear end of the body and cleaning rods 36 clean out the front end of the body.

The helical auger 27 may be constructed to move the material toward the front or rear of the body; or as illustrated in FIG. 2 of the drawing, it may be formed with two portions 127 and 127a, of relatively reversed twist, so that it moves the material both ways from a mid-point.

The addition of the helical auger 27 and discs 31 and 32 with sling rods 33 and cleaning rods 36, greatly increases the efficiency of the apparatus disclosed in Patent 2,886,332 in that the unloading shaft may be more easily started and the container may be more easily and completely unloaded, leaving almost no residue.

Although the invention has been described with respect to a preferred embodiment, it is not to be so limited, as changes and modifications can be made which are within the full intended scope as defined by the appended claims.

I claim:

1. A device for unloading and spreading material, comprising: a wheeled container having end walls and wall means connecting said end walls; a shaft in the upper portion of said container and having its ends supported by said end walls; means for rotating said shaft; a plurality of flail members spaced longitudinally along said shaft, said flail members being radially extensible relative to the shaft; and separate rigid starter means on said shaft and extending radially only a short distance from the shaft, said starter means comprising helical auger means extending along the shaft, said auger means being adapted, upon rotation of the shaft when the container is filled with material which may be engaged by the starter means, to move said material longitudinally relative to the shaft and thereby free the flails to fling the material from the container.

2. The device of claim 1 in which the auger means is a single continuous helix extending from end to end of the shaft.

3. The device of claim 1 in which the helical auger means has two auger parts, each of which starts at a plane intermediate the ends of the shaft and extends to one end of the shaft, said two auger parts being constructed and arranged to move material from said intermediate plane toward both ends of the shaft.

4. The device of claim 3 which includes a slinger rod supported by the shaft just inside one end wall for movement parallel to said one end wall, and a cleaning rod supported by the shaft just inside the other end wall for movement parallel to said other end wall, said slinger rod and cleaning rod cooperating with the starter means and flails in flinging material from the container.

5. A device for unloading and spreading material, comprising: a wheeled container having end walls and wall means connecting said end walls; a shaft in the upper portion of said container and having its ends supported by said end walls; means for rotating said shaft; a plurality of flail members spaced longitudinally along said shaft, said flail members being radially extensible relative to the shaft; separate rigid starter means on said shaft and extending radially only a short distance from the shaft, said starter means being adapted, upon rotation of the shaft when the container is filled with material which may be engaged by the starter means, to move said material relative to the shaft and thereby free the flails to fling the material from the container; and a slinger rod supported by the shaft just inside an end wall for movement parallel to the end wall, said slinger rod cooperating with the starter means and with the flails in flinging material from the container.

6. The device of claim 5 which includes a disc fixedly mounted on the shaft just inside an end wall, and in which the slinger rod is pivoted on the disc.

7. A device for unloading and spreading material, comprising: a wheeled container having end walls and wall means connecting said end walls; a shaft in the upper portion of said container and having its ends supported by said end walls; means for rotating said shaft; a plurality of flail members spaced longitudinally along said shaft, said flail members being radially extensible relative to the shaft; separate rigid starter means on said shaft and extending radially only a short distance from the shaft, said starter means being adapted, upon rotation of the shaft when the container is filled with material which may be engaged by the starter means, to move said material relative to the shaft and thereby free the flails to fling the material from the container; a slinger rod supported by the shaft just inside one end wall for movement parallel to said one end wall; and a cleaning rod supported by the shaft just inside the other end wall for movement parallel to said other end wall, said slinger rod and cleaning rod cooperating with the starter means and flails in flinging material from the container.

8. The device of claim 7 which includes a first disc fixedly mounted on the shaft just inside one end wall, and in which the slinger rod is pivotally mounted on the disc, which also includes a second disc fixedly mounted on the shaft just inside the other end wall, and in which the cleaning rod is mounted on the second disc.

9. A device for unloading and spreading material, comprising: a wheeled container having end walls and wall means connecting said end walls; a shaft in the upper portion of said container and having its ends supported by said end walls; means for rotating said shaft; a plurality of flail members spaced longitudinally along said shaft, said flail members being radially extensible relative to the shaft; separate rigid starter means on said shaft and extending radially only a short distance from the shaft, said starter means being adapted, upon rotation of the shaft when the container is filled with material which may be engaged by the starter means, to move said material relative to the shaft and thereby free the flails to fling the material from the container, and a slinger member supported by the shaft just inside an end wall, said member being constructed and supported to move only parallel to said end wall, and cooperating with the starter means and with the flails in flinging material from the container.

10. A device for unloading and spreading material, comprising: a wheeled container having end walls and wall means connecting said end walls; a shaft in the upper portion of said container and having its ends supported by said end walls; means for rotating said shaft; a plurality of flail members spaced longitudinally along said shaft, said flail members being radially extensible relative to the shaft; separate rigid starter means on said shaft and extending radially only a short distance from the shaft, said starter means being adapted, upon rotation of the shaft when the container is filled with material which may be engaged by the starter means, to move said material relative to the shaft and thereby free the flails to fling the material from the container; a slinger member supported by the shaft just inside one end wall; and a cleaning member supported by the shaft just inside the other end wall, said slinger member and said cleaning member being constructed and supported to move only parallel to said end walls, and cooperating with the starter means and with the flails in flinging material from the container.

11. A device for unloading and spreading material, comprising: a wheeled container having end walls, bottom and side wall means connecting said end walls, and an open top through which material may be discharged; a shaft in the upper portion of said container and having its ends supported by said end walls; means for rotating said shaft; a plurality of flail members spaced longitudinally along said shaft, said flail members being radially extensible relative to the shaft; and separate rigid starter means on said shaft and extending radially only a short distance from the shaft, said starter means being adapted, upon rotation of the shaft when the container is filled with material which may be engaged by the starter means, to move said material relative to the shaft and thereby free the flails to fling the material from the container.

12. A device for unloading and spreading material, comprising: a wheeled container having end walls and wall means connecting said end walls; a shaft in the upper portion of said container and having its ends supported by said end walls; means for rotating said shaft; a plurality of flail members spaced longitudinally along said shaft, said flail members being radially extensible relative to the shaft; and separate rigid starter means on said shaft and extending radially only a short distance from the shaft, said starter means having a fin-like structure which provides, adjacent any flail member, a fin that is diagonal to a plane perpendicular to the axis of the shaft, whereby, upon rotation of the shaft when the container is filled with material which may be engaged by the starter means, said starter means moves said material longitudinally relative to the shaft and thereby frees the flails to fling the material from the container.

13. A device for unloading and spreading material, comprising: a wheeled container having end walls, bottom and side wall means connecting said end walls, and an open top through which material may be discharged; a shaft in the upper portion of said container and having its ends supported by said end walls; means for rotating said shaft, a plurality of flail members spaced longitudinally along said shaft, said flail members being radially extensible relative to the shaft; and separate rigid starter means on said shaft and extending radially only a short distance from the shaft, said starter means being adapted, upon rotation of the shaft when the container is filled with material which may be engaged by the starter means, to move said material longitudinally relative to the shaft and thereby free the flails to fling the material from the container.

References Cited in the file of this patent

UNITED STATES PATENTS

| | | |
|---|---|---|
| 440,481 | Lamborn | Nov. 11, 1890 |
| 747,905 | Curtiss | Dec. 22, 1903 |
| 993,640 | Barnard | May 30, 1911 |
| 1,592,475 | Tanberg | July 13, 1926 |
| 2,360,827 | Cole | Oct. 24, 1944 |
| 2,504,787 | Bailey | Apr. 18, 1950 |
| 2,642,680 | Curtis et al. | June 23, 1953 |
| 2,792,229 | Berger et al. | May 14, 1957 |
| 2,882,667 | Brady | Apr. 21, 1959 |
| 2,886,332 | Elwick | May 12, 1959 |